E. E. COSTLEY.
MEASURING DEVICE.
APPLICATION FILED APR. 14, 1915.
1,236,272.
Patented Aug. 7, 1917.
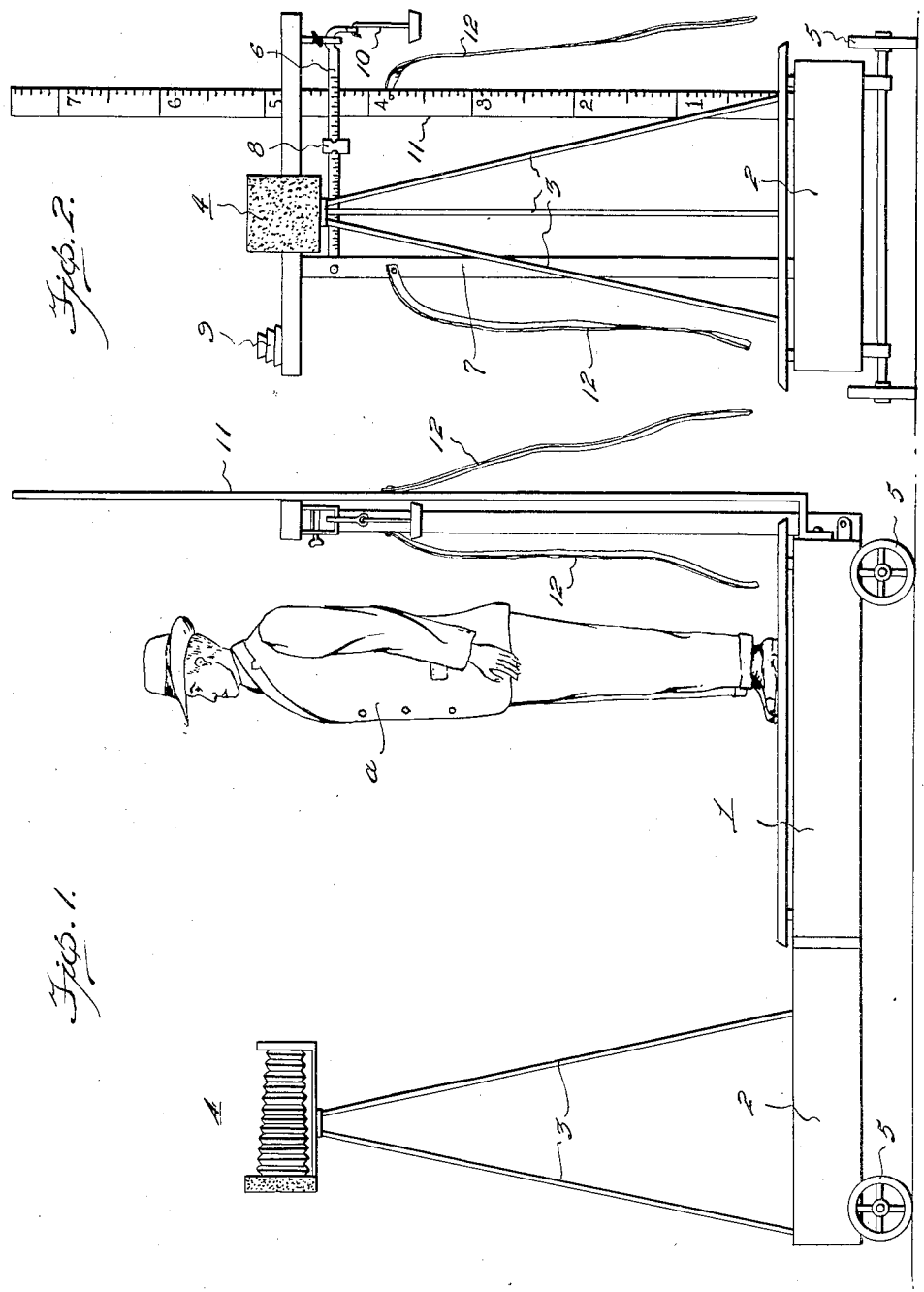
Inventor
E. E. Costley.
Witnesses

UNITED STATES PATENT OFFICE.

EMERY E. COSTLEY, OF WALKERSVILLE, MARYLAND.

MEASURING DEVICE.

1,236,272.  Specification of Letters Patent.  Patented Aug. 7, 1917.

Application filed April 14, 1915. Serial No. 21,300.

*To all whom it may concern:*

Be it known that I, EMERY E. COSTLEY, a citizen of the United States, residing at Walkersville, in the county of Frederick and State of Maryland, have invented certain new and useful Improvements in Measuring Devices; and I do hereby declare the following to be a full, clear, and exact description of the invention, such as will enable others skilled in the art to which it appertains to make and use the same.

This invention relates to measuring devices, designed for the purpose of giving the height, weight, and general measurements of a prospective customer for clothing by means of a photograph taken of the customer which will show the height and in some cases the weight, and which will give to a manufacturer of clothing sufficient information to insure a fit in a suit of clothes to be sent on to the customer, and at the same time will provide a good photograph of the customer for his use.

The measuring device is designed for the purpose of encouraging persons to order clothing by giving them a photograph on which will be indicated their height and weight.

The foregoing and other objects may be attained by means of the construction illustrated in the accompanying drawing, in which—

Figure 1 is a side elevation of a scale, a camera, and measuring devices, and showing a man standing upon the platform of the scale, and Fig. 2 is a view in elevation looking from the rear end of the camera.

Referring to the drawing, the numeral 1 designates a platform scale, which may be of the usual construction, and 2 is an extended platform for supporting a tripod 3 of a camera 4. The platforms 1 and 2 may be mounted on wheels 5. The scale beam 6 is of the usual construction and is connected to the rod in the hollow support 7 and is provided with a sliding weight 8 and is adapted to support a number of additional weights 9 upon the support 10.

A height measure 11 is secured to the platform at one side thereof and a pair of tape measures 12 are connected, one to the upright 7 and the other to the height measure 11, as shown.

A prospective customer $a$ may stand upon the platform 1 and have a photograph taken which will indicate his height approximately on the measure 11, and will indicate his weight upon the scale. The waist measurement may be readily taken and this information along with the proof of the photograph sent to the clothing manufacturer will give the required information for providing a suit which will fit the customer.

Various changes may be made in the details of construction without departing from the spirit and scope of the invention as defined in the claim.

What is claimed is:—

In an identification and recording apparatus, a platform scale, a base supporting said scale adjacent one end, a height measuring standard attached to the base at the end on which the scale is mounted, and a camera mounted on the opposite end of the base so that a person occupying the scale is positioned between the standard and the camera, whereby upon taking a photograph of the person his height and weight will simultaneously be recorded.

In testimony whereof I affix my signature in presence of two witnesses.

EMERY E. COSTLEY.

Witnesses:
CHAS. B. T. HENDRICKSON,
N. WILSON SCHLEY.